E. D. HOLLEY.
ENAMEL WARE.
APPLICATION FILED MAR. 12, 1908.
906,628.
Patented Dec. 15, 1908.
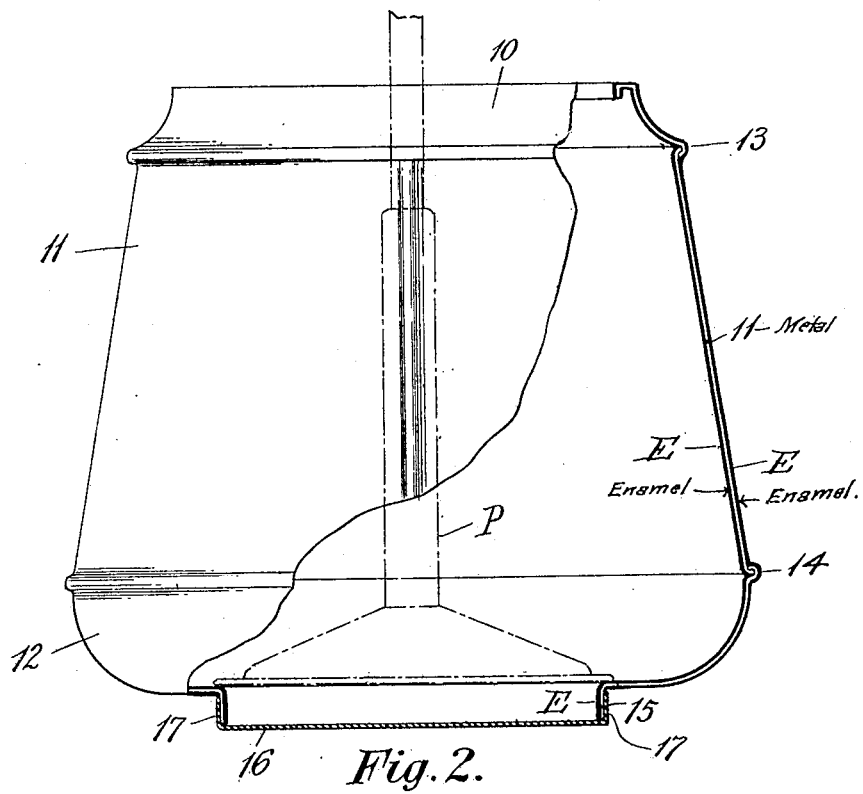
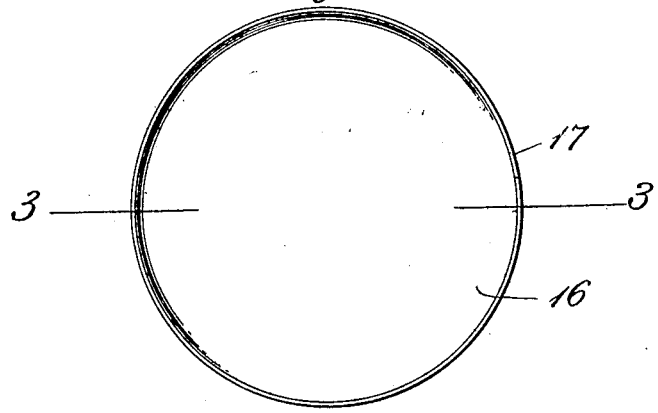
WITNESSES:
INVENTOR.
E. D. Holley,
BY
ATTORNEY.

UNITED STATES PATENT OFFICE.

EVERETT D. HOLLEY, OF FORESTVILLE, CONNECTICUT, ASSIGNOR TO BRISTOL BRASS COMPANY, OF BRISTOL, CONNECTICUT, A CORPORATION OF CONNECTICUT.

ENAMEL-WARE.

No. 906,628.   Specification of Letters Patent.   Patented Dec. 15, 1908.

Application filed March 12, 1908. Serial No. 420,559.

*To all whom it may concern:*

Be it known that I, EVERETT D. HOLLEY, a citizen of the United States, and resident of Forestville, in the county of Hartford and State of Connecticut, have invented certain new and useful Improvements in Enamel-Ware, of which the following is a full, clear, and exact specification.

This invention relates to enamel ware, and more especially to cooking utensils adapted to be placed on top of a range or stove, and it has for its object the provision of an enamel-coated metallic vessel having a perfectly flat bottom so that the vessel will stand firmly on its flat support, and, furthermore, that the heat of such support will be brought into direct full-surface contact with the vessel-bottom and consequently become effective on the contents of the vessel rapidly and without any waste which will naturally result when the bottom of the vessel rests on the heated surface only at certain portions thereof.

My invention is particularly applicable to what is generally known as "percolators", the bottom of which is provided with a cup or pocket to receive the "pumping device", the rapidity of operation of which depends to a great extent upon the amount of heat transmitted to the liquid in the pump chamber. While, generally, percolators having cups with perfectly flat bottoms are easily made of high-grade materials which do not require any protection against the corrosive action of water or similar liquid, a far different condition is met when attempts are made to produce the same results, viz., a flat bottom, in such vessels made of the lower grade of materials, such as steel or iron, which are coated with enamel to prevent the formation of rust. As a rule, vessels of this nature made of steel, Russia-iron, etc., can be very cheaply made as compared with the cost of those made of copper-alloys, silver, etc., firstly because the intrinsic value of the iron is very small, and secondly inasmuch as these vessels can be made in small sections the joints of which will be tight and completely covered by the enameling process without the employment of solder or brazing, therefore not only avoiding costly operations, but also providing a coating which will not be melted or destroyed except under the highest temperatures.

Experience has fully demonstrated that, no matter how perfectly flat may be the bottom of the pump-cup of a percolator, before the enamel coating is applied thereto, such bottom will almost invariably permanently "buckle" under the intense heat necessary for baking the enamel on the vessel, this "buckling" action being either inward so as to present only a circumferential line contact to the hot surface of the stove, or outward, in which instance not only the contact surface would be reduced practically to a very small area but the stability of the vessel, as a whole, would be destroyed.

Now, in order to avoid the defects above stated, I dispense with cup-bottom plate entirely when shaping the bottom section of the vessel; retaining, however, the downwardly-projecting flange which constitutes the annular wall of such cup, and then close the open bottom by a separately-formed cup made of some material which will resist corrosion, this cup being tightly united with the vessel, after the latter has passed through the enameling process.

In the accompanying drawings, in which similar characters denote similar parts, Figure 1 represents a side view, partly broken away, of a vessel or percolator pot embodying my invention. Fig. 2 is a top view of the separate cup-bottom, *per se*, and Fig. 3 is a section thereof on line 3—3 of Fig. 2.

In the present instance the vessel consists of three separately-formed sections 10, 11, 12, joined on lines 13, 14, and the bottom section 12 of which has a downwardly projecting annular flange 15 the outer surface of which is left free from the coat of enamel E which otherwise covers the entire surface, inside and outside, of the vessel. The inside diameter of the flange is such as to receive the percolator-pump indicated by dot and dash lines P in Fig. 1, and the open bottom of the enameled section 12 is closed by cup comprising a flat bottom 16, and an annular flange 17 the inner surface of which fits the flange 15 above mentioned, and may be sealed thereto in any suitable manner.

I am fully aware that vessels of various kinds have been and are being made with bottoms which are separate from the body portion of the vessel itself, and I do not wish to be understood as laying any claim broadly to any species of such vessels. On the other hand, I am enabled to produce, by my invention, a perfectly-flat bottom vessel, the manufacture of which includes a subjection thereof to an intense heat which would naturally destroy the efficiency of the vessel-bottom if the same were in place during the heating process.

I claim:—

1. The combination, with a heat-enameled vessel having a flange one side of which is free from the enamel coating, of a separately-formed bottom having a plain metal flange for engaging said vessel flange and sealed thereto after the vessel body has been enameled, whereby a flat smooth unbuckled bottom will be attained.

2. The combination, with a heat-enameled vessel having an opening at its bottom, a flange projecting downwardly from said vessel body and having a plain metal face, of a flat-bottom cup having a plain metal flange for engaging said vessel-flange and sealed thereto, whereby a flat smooth unbuckled bottom will be attained.

EVERETT D. HOLLEY.

Witnesses:
W. H. GRAHAM,
J. R. SMITH.